(12) United States Patent
Weick et al.

(10) Patent No.: US 7,595,463 B2
(45) Date of Patent: Sep. 29, 2009

(54) LASER PROCESSING MACHINE WITH MONITORING OF GAS ATMOSPHERE AND OPERATING GASES

(75) Inventors: Jürgen-Micheal Weick, Asperg (DE); Marc Dimiter, Kornwestheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/632,096

(22) Filed: Aug. 1, 2003

(65) Prior Publication Data
US 2004/0094525 A1    May 20, 2004

(30) Foreign Application Priority Data
Aug. 1, 2002    (EP) .................................. 02017281

(51) Int. Cl.
*B23K 26/00*    (2006.01)
*B23K 26/34*    (2006.01)
*B23K 26/38*    (2006.01)

(52) U.S. Cl. .............................. 219/121.62; 219/121.63; 219/121.67; 219/121.83; 219/121.84; 250/339.13; 372/59; 372/20

(58) Field of Classification Search ................ 219/121.61–121.69, 121.72, 121.84, 121.83; 250/339.13, 374; 372/55, 57, 58–60, 20
See application file for complete search history.

(56) References Cited

U.S. PATENT DOCUMENTS

| | | | | |
|---|---|---|---|---|
| 3,691,478 A | * | 9/1972 | Jacobs et al. ................. 250/215 |
| 4,112,367 A | * | 9/1978 | Hepner et al. ............. 324/244.1 |
| 4,222,011 A | * | 9/1980 | Kurnit ........................ 330/4.5 |
| 4,381,148 A | * | 4/1983 | Ulrich et al. ................. 356/213 |
| 4,476,150 A | | 10/1984 | Rose |
| 4,504,727 A | * | 3/1985 | Melcher et al. .......... 219/121.62 |
| 4,543,486 A | * | 9/1985 | Rose ........................ 250/492.1 |
| 4,594,004 A | * | 6/1986 | Ishida et al. ................. 356/433 |
| 4,646,309 A | * | 2/1987 | Arisawa et al. ................ 372/53 |
| 4,657,397 A | * | 4/1987 | Oehler et al. ................ 356/414 |
| 4,722,090 A | * | 1/1988 | Haruta et al. .................. 372/57 |
| 4,740,086 A | * | 4/1988 | Oehler et al. ................ 356/432 |
| 4,789,770 A | * | 12/1988 | Kasner et al. ............. 219/121.7 |
| 4,817,413 A | * | 4/1989 | Asano et al. ................ 73/24.02 |
| 4,919,536 A | * | 4/1990 | Komine ...................... 356/28.5 |

(Continued)

FOREIGN PATENT DOCUMENTS

DE    003508027 A1  *  9/1986

(Continued)

OTHER PUBLICATIONS

Derwent Acc No. 1990-254700, Derwent week 199034, Inventor Hermann D., Assignee VEB Transform Rontgen (VTRA), Pub No. DD276929A, Date Mar. 14, 1990, 2 pages.*

(Continued)

*Primary Examiner*—Samuel M Heinrich
(74) *Attorney, Agent, or Firm*—Fish & Richardson P.C.

(57) ABSTRACT

A laser processing machine includes a measuring cell into which gas to be analyzed can flow, a means for decoupling diagnostic radiation from the laser radiation provided for material processing of a workpiece, and a sound detector for detecting the photo-acoustical effect produced in the measuring cell due to absorption of the diagnostic radiation by gas in the cell.

31 Claims, 3 Drawing Sheets

U.S. PATENT DOCUMENTS

| | | | |
|---|---|---|---|
| 4,934,816 A * | 6/1990 | Silver et al. | 356/409 |
| 4,943,161 A * | 7/1990 | Michaelis et al. | 356/437 |
| 4,979,820 A * | 12/1990 | Shakkottai et al. | 356/129 |
| 5,288,469 A * | 2/1994 | Skalla | 422/171 |
| 5,298,716 A * | 3/1994 | Ogawa et al. | 219/121.67 |
| 5,331,649 A * | 7/1994 | Dacquay et al. | 372/23 |
| 5,339,674 A * | 8/1994 | Hammerich et al. | 73/24.02 |
| 5,463,202 A * | 10/1995 | Kurosawa et al. | 219/121.83 |
| 5,705,816 A * | 1/1998 | Ronge et al. | 250/345 |
| 5,763,855 A | 6/1998 | Shioji | |
| 5,811,653 A * | 9/1998 | Turpen | 800/294 |
| 5,811,753 A | 9/1998 | Weick et al. | |
| 5,841,017 A * | 11/1998 | Baraket et al. | 73/1.59 |
| 5,846,373 A * | 12/1998 | Pirkle et al. | 156/345.25 |
| 6,064,488 A | 5/2000 | Brand et al. | 356/440 |
| 6,075,223 A * | 6/2000 | Harrison | 219/121.85 |
| 6,414,263 B1 * | 7/2002 | Uchida et al. | 219/121.71 |
| 6,488,626 B1 * | 12/2002 | Lizzi et al. | 600/437 |
| 6,509,567 B2 * | 1/2003 | Boudet et al. | 250/345 |
| 6,665,124 B2 * | 12/2003 | Weckstrom | 359/639 |
| 6,791,057 B1 * | 9/2004 | Kratzsch et al. | 219/121.63 |
| 6,821,696 B2 * | 11/2004 | Katagiri et al. | 430/108.21 |
| 6,834,069 B1 * | 12/2004 | Bergmann et al. | 372/57 |
| 6,843,102 B1 * | 1/2005 | Shulga et al. | 73/25.01 |
| 6,873,414 B2 * | 3/2005 | Schuth et al. | 356/432 |
| 6,888,853 B1 * | 5/2005 | Jurgensen | 372/6 |
| 7,004,909 B1 * | 2/2006 | Patel et al. | 600/532 |
| 7,005,645 B2 * | 2/2006 | Von Drasek et al. | 250/339.13 |
| 2001/0012309 A1* | 8/2001 | Albrecht et al. | 372/55 |
| 2004/0179200 A1* | 9/2004 | Yoon et al. | 356/432 |
| 2005/0013328 A1* | 1/2005 | Jurgensen | 372/6 |

FOREIGN PATENT DOCUMENTS

| | | |
|---|---|---|
| DE | 19535720 | 3/1997 |
| EP | 000674965 A1 * | 10/1995 |
| EP | 0749800 | 12/1996 |
| JP | 409101230 A * | 4/1997 |
| JP | 2000171446 A * | 6/2000 |
| WO | WO9533594 | 12/1995 |
| WO | WO99/44040 A1 * | 9/1999 |

OTHER PUBLICATIONS

Kreuzer, L.B., "Laser Optoacoustic Spectroscopy—A New Technique of Gas Analysis", Analytical Chemistry, American Chemical Society, Columbus, US, 235A, 240A-244A, (1974).

* cited by examiner

LASER PROCESSING MACHINE WITH MONITORING OF GAS ATMOSPHERE AND OPERATING GASES

CLAIM OF PRIORITY

This application claims priority under 35 USC §119(a) to European Patent application number 02017281.3-1262, filed Aug. 1, 2002, the entire contents of which are hereby incorporated by reference.

TECHNICAL FIELD

The invention relates to a laser-processing machine and more particularly to a laser-processing machine for processing workpieces.

BACKGROUND

In a laser-processing machine including a $CO_2$ laser, laser radiation for material processing is generated by molecular oscillations. The generated laser radiation is usually guided through a gas atmosphere, which is kept free from substances that absorb the generated laser radiation with particular measures.

The measurement of the photo-acoustical effect was published, e.g. by L. B. Kreutzer: Laser opto-acoustical spectroscopy, A new technique of gas analysis, *Anal. Chem.* 46 239A, (1974).

German patent, DE 195 35 720 A1, discloses a method and an arrangement for leak-proofing of housings, in which gas escaping from the housing is irradiated by a light bundle from a light source, which is designed such that when the housing is not tight, the photo-acoustical effect can be measured. To improve the measurement, a feedback circuit is suggested.

To control the gas atmosphere, conventionally a molecular sieve is used (see e.g., European patent, EP 0 749 800) or nitrogen is used as a filling gas for the beam path (see e.g. WO 95/33594).

Applications against or shielding from gas entering from the outside are also known in the art.

$CO_2$ laser radiation is absorbed by many molecules to a higher or smaller degree. A precondition for absorption is that one of the molecular compounds has the matching binding energy. Examples of such gaseous substances that must be kept away from the beam path are $SF_6$, $C_2H_4$, halogenized hydrocarbons, ammonia, alcohols, acetone, and $CO_2$.

The detrimental effect of these gases is not absorption per se and therefore weakening of the power of the laser radiation required for processing, but the optical effect on the laser radiation produced through absorption, which widens the beam and distorts the phase front. The absorption that is relevant for laser processing machines has hardly any negative effect on the power. The actual detrimental effect is the negative influence of laser radiation resulting from the temperature increase and the resulting change of the refractive index.

Investigations have shown that impurities of <100 ppb (0.1 ppm) $SF_6$, which has the highest known absorption at 10 μm wavelength, is sufficient to decisively impair cutting of steel sheets with 3 kW laser power.

SUMMARY

The invention permits monitoring of the gas atmosphere and operating gases, which interact with laser processing, within a laser-processing machine.

In a first general aspect, a laser processing machine includes a measuring cell into which gas to be analyzed can flow, a means for decoupling diagnostic radiation from the laser radiation provided for material processing of a workpiece, and a sound detector for detecting the photo-acoustical effect produced in the measuring cell due to absorption of the diagnostic radiation by gas in the cell.

The laser processing machine may include one or more of the following features. The laser radiation is may be $CO_2$ laser radiation. The means for decoupling the diagnostic radiation from the laser radiation may include a means for diffracting laser radiation used for power measurement. The means for decoupling the diagnostic radiation from the laser radiation may include a means for reflecting laser radiation used for power measurement. The means for decoupling the diagnostic radiation from the laser radiation may include a partially-transparent mirror for reflecting laser radiation used for power measurement. The partially-transparent mirror may be a rear mirror of the radiation source. The laser-processing machine may further include a mechanical means for generating a pulsed diagnostic radiation. The laser-processing machine may further include an electronic means for generating a pulsed diagnostic radiation. The laser-processing machine may further include a control unit for using a rinsing gas in response to the photo-acoustical effect measured. The control unit may be formed for controlling the flow rate of one or more supply gases of the laser processing machine and of working or cutting gases in response to the analysis of a gas atmosphere in feed lines or in a laser beam path. The laser-processing machine may further include a common measuring cell for analyzing gases of the laser-processing machine. The gases of the laser-processing machine are may be supply gases, working gases, or cutting gases of the laser-processing machine. The laser-processing machine may further include a filter, where the configuration of the measuring cell and the sound detector is adapted for use to monitor the effect of the filter.

In a second general aspect, a method for controlling the laser-processing machine includes reducing a speed of processing in response to the measured photo-acoustical effect.

In a third general aspect, a method for controlling the laser-processing machine includes stopping a speed of processing in response to the measured photo-acoustical effect.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
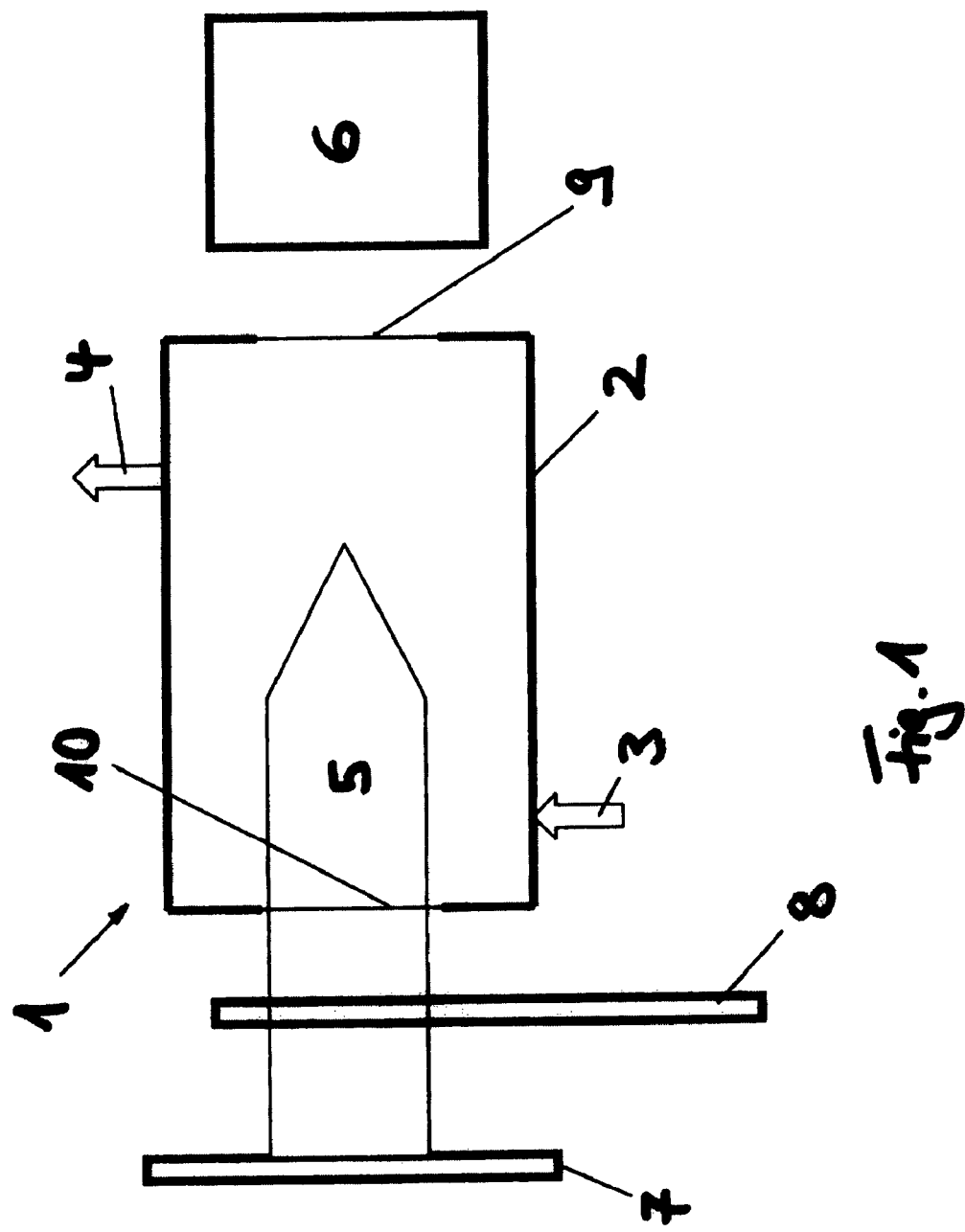
FIG. 1 is a schematic diagram of a gaseous medium in the region of a laser-processing machine.

Referring to FIG. 1, an arrangement 1 is shown with a gas-tight measuring cell 2 into which a gas atmosphere to be analyzed can enter and exit through a gas inlet 3 and a gas outlet 4. The gas is suctioned by means of a vacuum pump. The measuring line and measuring cell 2 must be evacuated to achieve the required purity. To analyze the gas, diagnostic radiation 5 of a $CO_2$ laser (not shown) of the laser-processing machine is guided through the measuring cell 2 with a wavelength of approximately 10 μm.

When gas molecules (e.g., $SF_6$) absorb part of the diagnostic radiation 5, the absorbed energy is given off subsequently in the form of kinetic and therefore thermal energy. This energy output produces a measurable pressure change in the gas cell, which can be detected by means of a sound detector (e.g., a sensitive microphone), due to the photo-acoustical effect. See L. B. Kreutzer: Laser opto-acoustical spectroscopy, A new technique of gas analysis, *Anal. Chem.* 46:239A (1974). When the gas located in the measuring cell 2 is systematically irradiated with pulsed diagnostic radiation 5 and absorbing molecules are in the gas atmosphere, they can receive part of the diagnostic radiation for a short time-period such that pressure change generated by absorption can be registered via a sound detector and be evaluated by means of electronic signal processing methods.

To generate the diagnostic radiation 5, a small part of the output of the $CO_2$ laser available for material processing of a workpiece is decoupled from the beam used for material processing. To generate a pulsed laser beam for diagnostic radiation 5, the chopper wheel 8 (e.g., a mechanical beam chopper) is used. Alternatively, the laser can be pulsed in a defined manner in the processing breaks, if possible, two to three specific measuring frequencies can be generated. 10 to 20 W of the laser radiation of the $CO_2$ laser beam impinging preferably on the rear mirror 7 of a radiation source is utilized. Approximately 0.2 to 1% of the laser power is decoupled for gas analysis. The diagnostic radiation 5 is guided through the measuring cell 2 wherein the sound detector is located. A power measuring head 6 is located at the opposite end of the measuring cell 2 behind a window 9 for measuring the irradiated laser power.

A partially-transparent mirror used for guidance of the $CO_2$ laser beam can be used to decouple the diagnostic radiation 5. The diagnostic radiation 5 can also be guided out of the processing beam of the $CO_2$ laser through reflection or diffraction and be irradiated into the measuring cell 2 through a window 10.

Small concentrations of $SF_6$ or $C_2H_4$ can be detected in the measuring cell, since strong absorption of a diagnostic radiation (e.g., 10.6 μm) can be utilized. Decoupling of the diagnostic radiation from the existent laser radiation for material processing permits omission of an additional measuring laser, which is contained in the conventional systems. Real-time analysis of the quality of the gas atmosphere in the beam path or of the working gases of the laser and the welding or cutting gases can be realized.

The arrangement 1 can be permanently installed on a laser-processing machine (e.g. as diagnostic unit), which is not shown. The arrangement 1 may be provided as a diagnostic module, which can be retrofitted and be additionally mounted to an existing laser processing machine. It is also possible to connect the arrangement 1 for a short time to the laser-processing machine for measurements or analyses. The arrangement 1 can measure the quality of a gas atmosphere within the laser-processing machine (suctioned by a vacuum pump) in a cyclic fashion: air or nitrogen in the beam path; cutting, welding or protective gas for material processing; and laser operating gases. Possible problems of material processing due to influence of the laser radiation through contaminated gases can be preventively avoided.

The gas atmosphere can be controlled in the beam guideway as regards purity. The rinsing (cleaning) gas (nitrogen) must be blown through not on a permanent basis but only when required.

Figure 2:
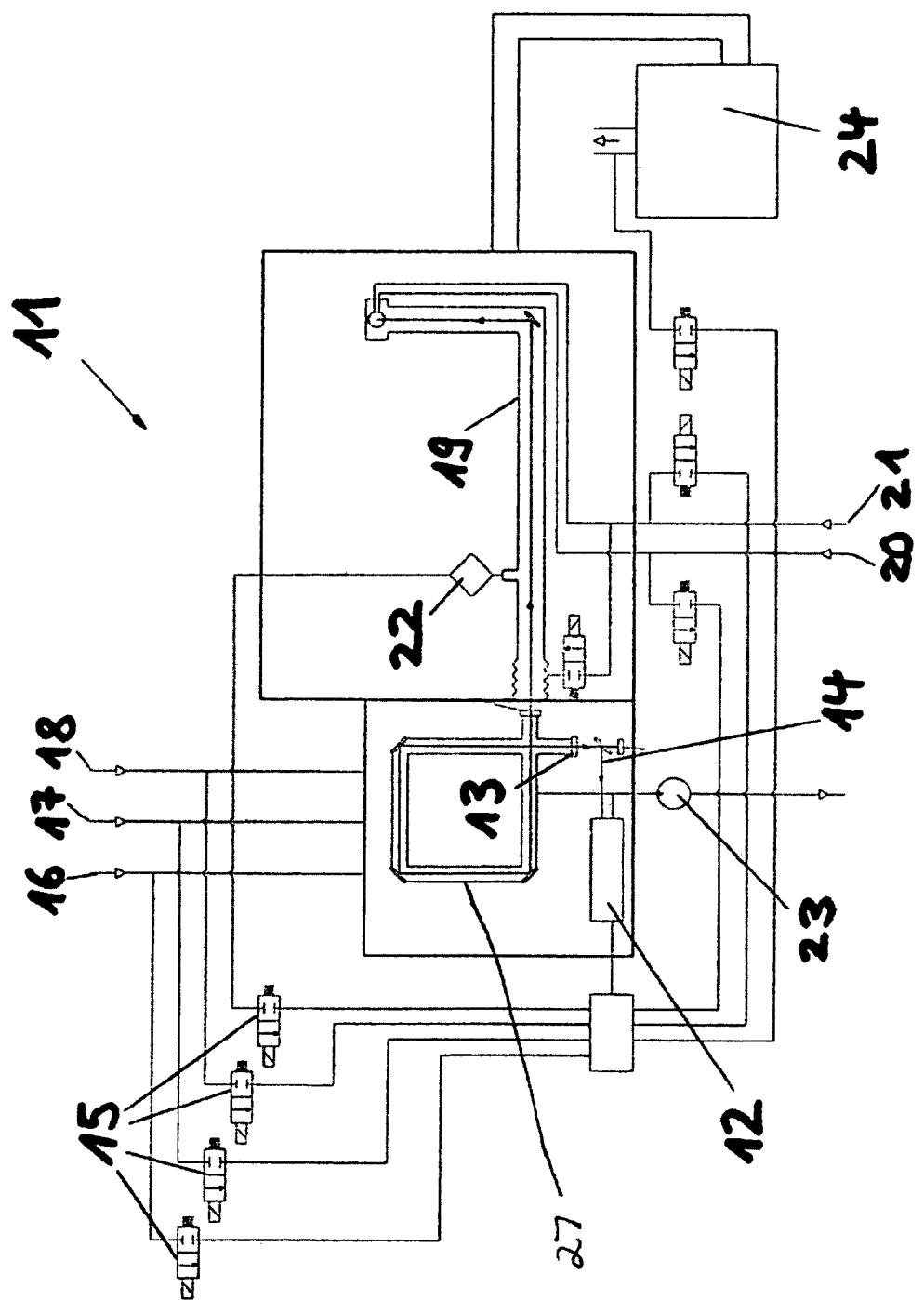
FIG. 2 is a schematic diagram of a laser-processing machine.

Referring to FIG. 2, in a laser-processing machine 11, one single measuring cell 12 is provided for checking the gas composition in the feed lines of the supply gases, the cutting and working gases, and the gases in the beam path. The laser beam 14 that exits from a rear mirror 13 of a laser 27 and is supplied to a power measuring head 14 is directed into the measuring cell 12 as a diagnostic beam. Gases to be examined are selectively supplied to the multiplex circuit and valves 15. These may be gases from feed lines for supply gases of the laser (i.e., from a feed line 16 (CO2), 17 (N2) and 18 (He)). The gas atmosphere in a beam path 19, into which cutting and working gases are guided via a feed line 20 (O2) and a feed line 21 (N2) can be tested since the feed line is provided with a gas exit 22, a feed line to the measuring cell 12, and a valve 15. The measuring cell 12 is associated with a vacuum pump 23 for evacuating the measuring cell 12. Feedback of the gases into the beam path 19 after the gas exit 22 is also feasible.

The laser-processing machine 11 is completed by a suctioning unit 24 with a filter for the gases of the laser-processing machine 11. If plastic material is cut and an active carbon filter is used, the filter effect can be monitored by means of the arrangement for gas analysis (measuring cell, sensor) and a warning signal can be generated when the active carbon is covered and adsorption is insufficient.

Figure 3:
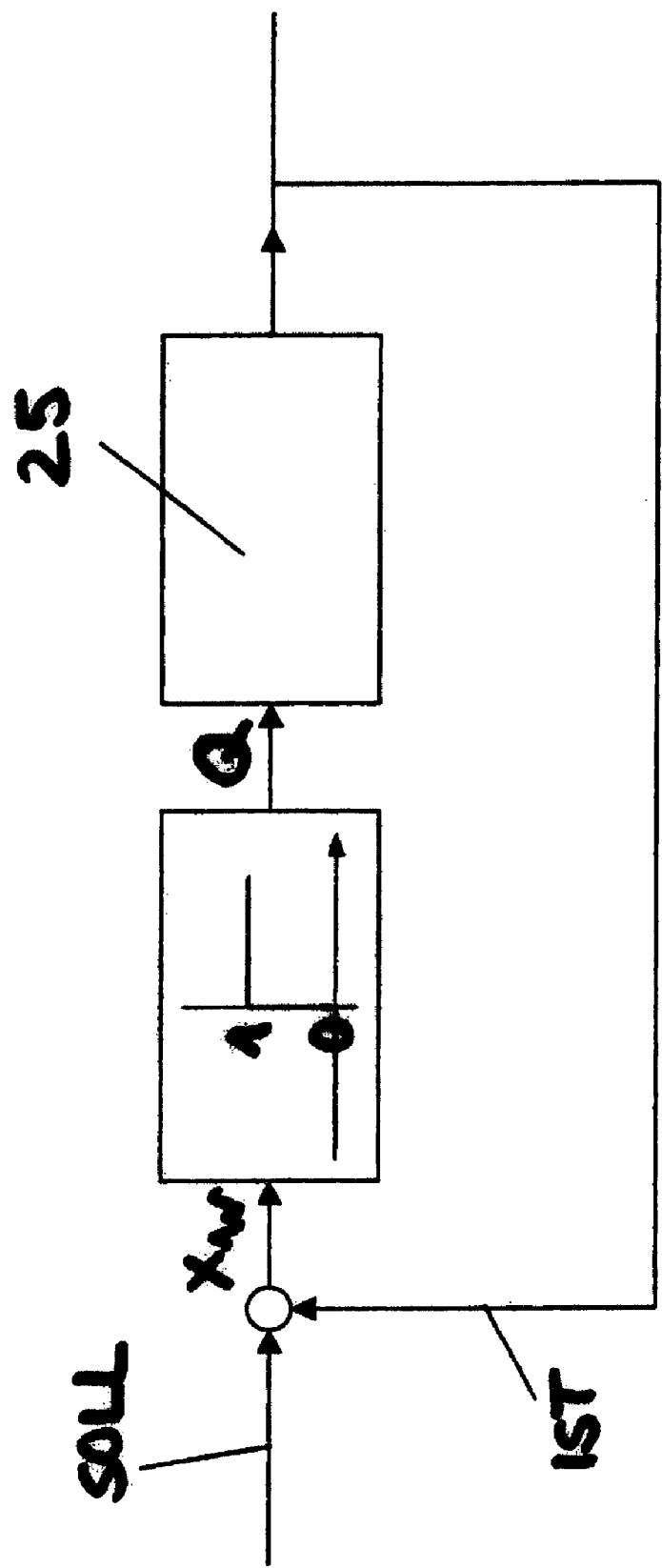
FIG. 3 is a schematic diagram of an apparatus for controlling a laser-processing machine Like reference symbols in the various drawings indicate like elements.

Referring to FIG. 3, the gas flow of the working and cutting gases can be regulated by controlling the gas volume 25 in the beam path 19 for absorption of diagnostic radiation. A comparison between the actual value and the desired value results in that when a limiting value $X_W$ has been exceeded, the flow rate Q of the working and cutting gases is increased during absorption to replace the disturbing gas molecules by following gas molecules of the working and cutting gases. The rinsing gas (nitrogen) must not be blown through at a permanent basis at a high flow rate, but only when required.

A control unit can be provided for using a rinsing gas in response to the measured photo-acoustical effect. The rinsing gas may be used only when required. The $N_2$ consumption can be reduced. The flow rate of the gases of the laser-processing machine is controlled in that when the feed line or the laser beam path is contaminated, the feed line or laser beam path is cleaned with an increased flow through the feed or through-flow with gases of maximum purity.

To facilitate the design of the laser processing machine a common measuring cell may be provided for analyzing different gases of the laser processing machine, in particular of supply gases of the laser and/or the laser processing machine, cutting and/or working gases.

Furthermore, the measurement of the photo-acoustical effect may be used to control the laser-processing machine by reducing the speed (emergency run) of processing or stop processing (stop) depending on the measured photo-acoustical effect. Faulty processing is interrupted in due time.

A number of embodiments have been described. Nevertheless, it will be understood that various modifications may be made. Accordingly, other embodiments are within the scope of the following claims.

What is claimed is:
1. A laser-processing machine comprising:
   a laser that produces laser radiation at a wavelength λ and that is associated with one or more operating gases, wherein the one or more operating gases include one or more gases of the gas atmosphere through which the laser is guided, one or more laser-processing machine gases that are used on the workpiece, and one or more supply gases for the laser;

a means for decoupling diagnostic radiation from the laser radiation that is produced by the laser, the means for decoupling diagnostic radiation being positioned in the path of the laser radiation that is produced by the laser thus providing diagnostic radiation that is used for analysis of one or more operating gases and providing laser radiation that is directed to the workpiece;

a measuring cell that contains a portion of the one or more operating gases to be analyzed, the measuring cell being positioned downstream of the means for decoupling diagnostic radiation and in the path of the decoupled diagnostic radiation such that the measuring cell receives the decoupled diagnostic radiation; and a sound detector for detecting a photo-acoustical effect due to absorption of the diagnostic radiation at the wavelength $\lambda$ by the portion of one or more operating gases in the measuring cell to thereby analyze the one or more operating gases.

2. The laser-processing machine of claim 1, wherein the laser radiation is $CO_2$ laser radiation.

3. The laser-processing machine of claim 1, wherein the means for decoupling the diagnostic radiation from the laser radiation produced by the laser includes a means for diffracting laser radiation used for power measurement.

4. The laser-processing machine of claim 1, wherein the means for decoupling the diagnostic radiation from the laser radiation produced by the laser includes a means for reflecting laser radiation used for power measurement.

5. The laser-processing machine of claim 1, wherein the means for decoupling the diagnostic radiation from the laser radiation produced by the laser includes a partially-transparent mirror for reflecting laser radiation used for power measurement.

6. The laser-processing machine of claim 5, wherein the partially-transparent mirror is a rear mirror of the radiation source.

7. The laser-processing machine of claim 1, further comprising a mechanical means for generating a pulsed diagnostic radiation.

8. The laser-processing machine of claim 1, further comprising an electronic means for generating a pulsed diagnostic radiation.

9. The laser-processing machine of claim 1, further comprising a control unit for using a rinsing gas in response to the photo-acoustical effect measured.

10. The laser-processing machine of claim 9, wherein the control unit is formed for controlling the flow rate of one or more operating gases of the laser processing machine in response to the analysis of a gas atmosphere in feed lines or in a laser beam path.

11. The laser-processing machine of claim 1, wherein the one or more laser-processing machine gases are supply gases.

12. The laser-processing machine of claim 1, wherein the one or more laser-processing machine gases are cutting gases.

13. The laser-processing machine of claim 1, wherein the one or more laser-processing machine gases are working gases.

14. The laser-processing machine of claim 1, further comprising a filter, wherein the configuration of the measuring cell and the sound detector are adapted for use to monitor the effect of the filter.

15. The laser-processing machine of claim 1, further comprising a means for directing the portion of the laser-processing machine gas in the measuring cell to flow back to the laser after it has been analyzed.

16. The laser-processing machine of claim 11, wherein the supply gases are supply gases of the laser.

17. The laser-processing machine of claim 1, wherein the one or more laser-processing machine gases are laser operating gases.

18. The laser-processing machine of claim 17, wherein the laser operating gases comprise $CO_2$.

19. The laser-processing machine of claim 1, wherein the one or more laser-processing machine gases are welding gases or protective gases.

20. A diagnostic machine comprising:

a radiation decoupler positioned downstream of a laser and in the path of laser radiation of wavelength $\lambda$ that is produced by the laser to provide diagnostic radiation and to provide laser radiation that is directed to a workpiece;

a measuring cell that contains operating gas to be analyzed, the measuring cell being positioned downstream of the radiation decoupler and in the path of the decoupled diagnostic radiation such that the measuring cell receives the decoupled diagnostic radiation, wherein the measuring cell includes an inlet that receives the operating gas to be analyzed from one or more of gases of the gas atmosphere through which the laser is guided, laser-processing machine gases that are used on the workpiece, and supply gases for the laser; and a sound detector positioned relative to the measuring cell, and configured to detect a photo-acoustical effect due to absorption of the decoupled radiation at wavelength $\lambda$ by the operating gas in the measuring cell to thereby analyze the operating gas.

21. The diagnostic machine of claim 20, wherein the radiation decoupler includes a diffractor that diffracts the laser radiation produced by the laser.

22. The diagnostic machine of claim 20, wherein the radiation decoupler includes a reflector that reflects at least part of the laser radiation produced by the laser.

23. The diagnostic machine of claim 20, wherein the radiation decoupler includes a partially-transparent mirror that reflects the laser radiation produced by the laser.

24. The diagnostic machine of claim 20, further comprising a pulse generator at an output of the laser and in the path of the laser radiation produced by the laser.

25. The diagnostic machine of claim 20, further comprising a control unit for using a rinsing gas in response to the photo-acoustical effect measured.

26. The diagnostic machine of claim 20, further comprising a filter, wherein the configuration of the measuring cell and the sound detector are adapted for use to monitor the effect of the filter.

27. The diagnostic machine of claim 20, wherein the operating gas to be analyzed is a laser operating gas.

28. The diagnostic machine of claim 27, wherein the laser operating gas is $CO_2$.

29. The diagnostic machine of claim 20, wherein the operating gas to be analyzed comprises gas from a gas atmosphere within the laser.

30. The diagnostic machine of claim 20, wherein the operating gas to be analyzed is a supply gas of the laser.

31. The diagnostic machine of claim 20, wherein the operating gas to be analyzed is a cutting gas or a working gas.

* * * * *

UNITED STATES PATENT AND TRADEMARK OFFICE
CERTIFICATE OF CORRECTION

PATENT NO. : 7,595,463 B2  Page 1 of 1
APPLICATION NO. : 10/632096
DATED : September 29, 2009
INVENTOR(S) : Jürgen-Michael Weick It is certified that error appears in the above-identified patent and that said Letters Patent is hereby corrected as shown below:

On the Title page, item 75 delete "Jürgen-Micheal Weick" and insert --Jürgen-Michael Weick--.

On the Title page, item 75 delete "Marc Dimiter" and insert --Marc Dimter--.

Col. 5, Line 58, delete "cuffing" and insert --cutting--.

Signed and Sealed this

Eighth Day of December, 2009

David J. Kappos
*Director of the United States Patent and Trademark Office*